(12) United States Patent
Chaine et al.

(10) Patent No.: US 9,489,089 B2
(45) Date of Patent: Nov. 8, 2016

(54) TOUCH-SENSITIVE PANEL

(75) Inventors: Sebastien Chaine, L'Hay-les-Roses (FR); Thomas Filton, Savigny-sur-Orge (FR); Sebastien Pelletier, Issy-les-Moulineaux (FR)

(73) Assignee: Elo Touch Solutions, Inc., Milpitas, CA (US)

( * ) Notice: Subject to any disclaimer, the term of this patent is extended or adjusted under 35 U.S.C. 154(b) by 1162 days.

(21) Appl. No.: 12/863,258

(22) PCT Filed: Jan. 23, 2009

(86) PCT No.: PCT/EP2009/000432
§ 371 (c)(1),
(2), (4) Date: Nov. 3, 2010

(87) PCT Pub. No.: WO2009/092599
PCT Pub. Date: Jul. 30, 2009

(65) Prior Publication Data
US 2011/0047494 A1    Feb. 24, 2011

(30) Foreign Application Priority Data

Jan. 25, 2008  (EP) .................................... 08290067
Jan. 16, 2009  (EP) .................................... 09290036

(51) Int. Cl.
*G06F 3/043*    (2006.01)
*G06F 3/0488*   (2013.01)

(52) U.S. Cl.
CPC ......... *G06F 3/0436* (2013.01); *G06F 3/04883* (2013.01)

(58) Field of Classification Search
CPC .... G06F 3/041; G06F 3/0414; G06F 3/0416; G06F 3/043–3/0436; G06F 3/04883
USPC .................... 345/173–178; 178/18.01–20.04
See application file for complete search history.

(56) References Cited

U.S. PATENT DOCUMENTS

| 4,931,782 A | * | 6/1990 | Jackson ........................ 345/174 |
| 5,518,078 A | | 5/1996 | Tsujioka et al. |
| 5,589,856 A | * | 12/1996 | Stein et al. .................... 345/173 |

(Continued)

FOREIGN PATENT DOCUMENTS

| CN | 2476846 Y | 2/2002 |
| EP | 1798635 A1 | 6/2007 |

(Continued)

OTHER PUBLICATIONS

Office Action from Japanese Patent Application No. 2010-543435, dated Jun. 19, 2012.

(Continued)

*Primary Examiner* — David Tung
(74) *Attorney, Agent, or Firm* — Alston & Bird LLP

(57) ABSTRACT

The invention relates to a touch sensitive panel comprising a single interaction means with at least a first and a second interaction area, wherein the interaction means is transparent in the first interaction area, at least one transforming means for transforming a mechanical, in particular pressure, excitation of the at least first and/or second interaction area of the interaction means into respective signals, and a processing means configured to identify the position of the excitation based on the signals. It furthermore relates to a device comprising such touch sensitive panel. It furthermore relates to an improved drag and drop method.

23 Claims, 8 Drawing Sheets

(56) References Cited

U.S. PATENT DOCUMENTS

| | | | |
|---|---|---|---|
| 6,091,406 | A | 7/2000 | Kambara et al. |
| 7,088,343 | B2* | 8/2006 | Smith et al. .................. 345/173 |
| 7,204,148 | B2 | 4/2007 | Tanaka et al. |
| 2002/0126102 | A1* | 9/2002 | Redmayne .................... 345/173 |
| 2003/0043113 | A1 | 3/2003 | Itoh |
| 2003/0107604 | A1 | 6/2003 | Ording |
| 2004/0001073 | A1 | 1/2004 | Chipchase |
| 2004/0178998 | A1* | 9/2004 | Sharp .................... G06F 3/0436 345/177 |
| 2005/0289476 | A1* | 12/2005 | Tokkonen ..................... 715/769 |
| 2006/0278692 | A1 | 12/2006 | Matsumoto et al. |
| 2007/0229475 | A1* | 10/2007 | Gettemy et al. ............. 345/173 |
| 2007/0247434 | A1* | 10/2007 | Cradick et al. ............... 345/173 |
| 2008/0100594 | A1 | 5/2008 | Tsumura |
| 2008/0117188 | A1* | 5/2008 | Ko .......................... G06F 21/36 345/177 |
| 2009/0153438 | A1* | 6/2009 | Miller et al. .................... 345/55 |

FOREIGN PATENT DOCUMENTS

| | | |
|---|---|---|
| JP | 8-190456 A | 7/1996 |
| JP | 10-240443 A | 9/1998 |
| JP | 11-312054 | 9/1999 |
| JP | 2006-344217 A | 12/2006 |
| WO | WO 2006/094739 A | 9/2006 |
| WO | WO 2007/118893 A | 10/2007 |

OTHER PUBLICATIONS

May 8, 2008 European Search Report for European Application No. 08290067, completed May 8, 2008.

Office Action from Chinese Patent Application No. 2476846Y, dated Feb. 27, 2013.

* cited by examiner

TOUCH-SENSITIVE PANEL

CROSS-REFERENCE TO RELATED APPLICATIONS

The present application is the national phase entry of PCT/EP2009/000432 having international filing date Jan. 23, 2009, which claims priority to European patent application 08 290 067.1 filed Jan. 25, 2008 and to European patent application 09 290 036.4 filed Jan. 16, 2009.

BACKGROUND

The invention relates to a touch-sensitive panel and a device comprising the touch-sensitive panel.

EP 1 798 635 A1 discloses a handheld electronic device having a virtual keypad input device, which includes a case, an input apparatus and a processor apparatus disposed on the case. The input apparatus includes a number of vibrational sensors that sense the vibrational results of a contact with the case. Therefrom, the process apparatus determines the location on the case where a contact was made. The case includes a housing and a display including a screen and a cover. The cover of the display is incorporated into the front wall of the case and a portion of that front surface extends across the cover. EP 1 798 635 A1 stipulates that the sensors attached to the case, receive vibrational signals arising from contacts on the cover of the display, and that the processor apparatus determines the location of the contacts such that the display can be turned into a touch-sensitive display.

The proposed structure has the following problem. By providing the vibrational sensors on the housing, the vibrational signals created on the cover of the display have to cross the interface between the cover and the housing. This leads to a deterioration of the signal quality and, furthermore—over time—the properties of the interface change which, in the worst case, make inputs on the display undetectable.

It is therefore the object of the present invention to provide a touch-sensitive panel which overcomes the above-mentioned problem and thus, provides a more reliable touch-sensitive panel.

DESCRIPTION OF THE INVENTION

This object is achieved with the touch-sensitive panel according to claim 1. The touch-sensitive panel according to the invention comprises a single interaction means with at least a first and a second interaction area, wherein the interaction means is transparent in the first interaction area, at least one transforming means for transforming a mechanical, in particular a pressure, excitation of the at least first and/or second interaction area of the interaction means into a respective signal, and a processing means configured to identify the position of the excitation based on the signal/signals.

In this context, an interaction means can e.g. be a glass or plastic plate which, according to the invention, is made out of one piece. The interaction means can have a smooth surface on at least one of its main surfaces and the surface can be plane or curved. The transforming means can be a transducer like, for example, a strain gauge or a piezoelectric transducer capable of sensing acoustic signals being the result of an excitation. An excitation can be provided by a finger, a gloved finger, a stylus etc. The processing means can comprise an interface via which action triggering signals can be output. When used in combination with a transducer sensing acoustic signals, the processing means is configured to identify the location of an impact based on the sensed acoustic signals.

When the touch-sensitive panel is working together with a screen, the first interaction area, which is transparent, can render the screen touch sensitive and the second interaction area can be used as a further input means. As both areas are provided on a single interaction means, the signals sensed by the transforming means do not have to pass via an interface and, as a consequence, do not depend on the stability over time of this interface and no degradation of the signal quality due to a change in the interface properties can occur.

The single, one piece, interaction means furthermore has the advantage that a smooth surface can be provided which is easily cleanable compared to a device where a housing at least partially extends across a cover where dust etc. can accumulate in the edge regions. Finally, a smooth surface also renders the visual aspect of the device more attractive.

Preferably the second interaction area can comprise secondary button areas and wherein the processing means can be configured to trigger predetermined actions upon an excitation of at least one of the secondary button areas. These secondary button areas simulate thus switches which can be used to provide further inputs into a device with which the touch-sensitive panel is connected. Another application of the secondary button area relates to its use as touchpad or scroll bar to move e.g. of cursor on a screen connected to the touch sensitive panel. The button areas can, for example, be provided by printing them onto the front or rear surface of the interaction means or by using printed adhesive foils or by directly printing them onto the interaction means. By doing so, it is no additional hardware switches need to be provided.

According to a preferred embodiment, the second interaction area can be opaque. When the panel is used together with a display panel underneath the first interaction area, the opaque second interaction area can hide the frame of the display panel of screen and furthermore the usually unused frame area of a display can be turned into a useful area, namely an additional input means.

Advantageously, the at least one transforming means and/or the processing means can be arranged in the second interaction area. By doing so, they do not obstruct the transparent first interaction area and can preferably be hidden behind the opaque second interaction area thereby also keeping the lateral extension of the device small.

According to a further advantageous variant of the invention, the transforming means and/or the processing means can be embedded in the interaction means, preferably in the region of the second interaction area. By doing so, the volume of the touch-sensitive panel essentially corresponds to the one of the interaction means, so that no space is unnecessarily wasted.

Advantageously, the first interaction area can be positioned on a main surface of the single interaction means and the second interaction area can at least be positioned on at least one side surface of the interaction means. By doing so, not only the main surface side of the interaction means becomes useful for providing inputs, but also an additional input area can be provided on the side surfaces, thereby enhancing the flexibility with respect to input possibilities.

According to an advantageous embodiment, the single interaction means, the at least one transforming means and the processing means can form a module. With this module, any device can be turned into a touch-sensitive device without having to carry out a heavy integration effort. It is simply sufficient to attach the module to the device and to connect the interface of the processing means with the corresponding one of the device to achieve this object.

Preferably, the single interaction means of the touch sensitive panel can furthermore comprise at least one additional third transparent interaction area. Providing an additional transparent interaction area, typically separated from the first transparent interaction area, allows to place an additional screen underneath the same tactile interaction means which could be used to display the content and/or any parameters of an external device, e.g. an external storage device, a multimedia player, a printer etc.

Advantageously, the single interaction means of the touch sensitive panel can further comprise a writable area over the second interaction area, in particular adjacent the third interaction area and/or the secondary button areas. The writable area could be a removable tag of paper, carton or plastic, or in case of an interaction means out of glass, the surface could be sandblasted. According to a further variant, silk-screening could be used to provide a writable area. The writable area is a simple and low cost way of providing information, e.g. using a pen, about the allocation of the third interaction area and/or the secondary button areas.

The object of the invention is also achieved with a device, in particular a laptop, an on-board computer, a mobile phone, a personal digital assistant (PDA), a television, a HiFi device, an automatic vending or teller machine, a playing console or a machine input device, comprising a screen with a display panel and a touch-sensitive panel as described above. Like already mentioned above, the touch-sensitive panel brings the advantage that, the display panel region of the screen can be rendered into a touch-sensitive device reliable in time. In addition, due to the single interaction means, like a glass or plastic plate, a smooth surface without protruding edges is achieved which renders the device easily cleanable and, furthermore, visually attractive.

Preferably, the touch-sensitive panel can be arranged such that the first interaction area is over the display panel of the screen thereby forming a touch-sensitive display and furthermore arranged such that the second interaction area is positioned away from the display panel. Thus, outside the display panel area of the screen, the second interaction area can be used for additional input features.

According to a preferred embodiment, the device can be configured to carry out predetermined actions upon triggering of an excitation at a predetermined area of the second interaction area by the processing means, wherein the action is, in particular linked to information displayed on the screen (soft key action) and/or linked to a hardware functionality. Thus, the second interaction area can be used, for example, to switch on or off the device or switch between different hardware configurations like changing the luminosity or the volume of loud speakers of the device, but can also be used to trigger actions about information displayed on the screen, for example, printing of the screen, or any other kinds of soft key actions or any information in general present or stored in the device. One particular advantage of this feature is that virtually the size of the screen can be enlarged as soft keys do not have to be provided over the display area of the screen anymore. Thus for the same functionality, a smaller screen could, for example, be used rendering the overall device cheaper.

According to a preferred embodiment, the device can be configured to drag an action or object from the display panel of the screen based on a triggered excitation on the first interaction area and to drop the action or object onto a secondary button area of the second interaction area based on the subsequent triggered excitation on the second interaction means. E.g. virtually any object, like an electronic text document, could be dragged away form a computer screen and dropped onto a predetermined position on the second interaction area. Upon detection of an excitation at that position on the second interaction area, the processing unit can trigger a signal which informs the computer to e.g. print the document or to remove it. This again enlarges the flexibility of a device with respect to in and output activities.

According to a preferred embodiment, the second interaction area can only extend over the area of the frame of the display panel. In particular, the interaction means also does not extend over the frame of the display panel. By doing so, not only a visually attractive design can be achieved, but the usually non-used frame area of the display can be turned into a useful area without having to enlarge the size of the device.

According to an advantageous variant, the interaction means can extend laterally on at least one side over the device. In this case, also the second interaction area could extend laterally over the device. By doing so, the device could, for example, be embedded into a piece of furniture with the interaction means being flush mounted with the surface of that piece of furniture so that, due to the large area of the interaction means, an enlarged input area can be provided. This enlarged input area could, for example, be used to provide enlarged buttons to facilitate the input, for example for people with viewing deficiencies, or simply additional buttons can be provided to facilitate the inputting of information.

According to an advantageous embodiment, the device can be configured to carry out a scroll bar functionality in the screen based on excitations identified on at least one of the side surfaces of the interaction means. As already mentioned above, not only the main surface side of the interaction means can be turned into a useful area, but also the side or even the back side could be used as further input areas. With respect to today's electronic devices usually having a navigational possibility in the screen, the provision of a scroll bar on the side of the device is intuitive and keeps the overall device size small as, the scroll functionality does not need to be provided on the main surface side.

According to a preferred embodiment, the device can comprise at least one interface configured to allow a connection with an external device and arranged within or adjacent the second interaction area: wherein the second interaction area comprises a predetermined area assigned to the interface, and wherein the processing means is configured to trigger a predetermined interaction task between the device and the external device upon triggering of an excitation at the predetermined area assigned to the interface. In this configuration, the device can provide a direct shortcut to the external device. This functionality increases the ergonomics of the device as a user intuitively will be able to transfer data illustrated on the screen to the external device, by providing an impact on the corresponding predetermined area.

In this embodiment, the interface can be a physical interface which allows a cable or wire based connection with the external device or a virtual interface representing a wireless interface using a corresponding pictogram provided on the interaction means.

Preferably, the predetermined area assigned to the interface can be adjacent, in particular touching, an edge region of the interface configured to allow a connection with an external device. In this embodiment the attribution of the predetermined area to the external device is immediate. Further preferred, the predetermined area assigned to the interface can encircle the interface.

Advantageously, the interface can be arranged on the main surface of the single interaction means. In this case the external device is connected via a cable to the side of the interaction means where the user also carries out input actions with respect to the internal device. By simply sliding over the surface of the interaction means towards the interface, a data transfer can be enabled which further simplifies the handling of the two devices.

According to an advantageous embodiment, the device according to the invention can further comprise a secondary screen with a secondary display panel positioned underneath the third transparent interaction area. By providing one tactile interaction means over both screens a tactile continuity is provided between the two screens. This facilitates the transfer of data which is for example displayed on one screen.

Preferably, the device can comprise at least one interface configured to allow a connection with an external device and arranged within or adjacent the second interaction area: wherein the processing means is configured to trigger a predetermined interaction task between the device and the external device upon triggering of an excitation of the third interaction area. The secondary screen in this configuration is attributed to the external device and upon connection with an external device configured to illustrate e.g. the content of the external device. Thus the secondary display is dedicated to the external device and as a consequence the data transfer between the external device and the internal device is simply carried out moving an object, e.g. a file, folder or a shortcut, over the single interaction means from one screen to the other.

The invention furthermore relates to a drag and drop method. In this context the drag and drop feature relates to a method known in the context of graphical user interfaces of e.g. computer (a display panel of the computer screen) and which consists in clicking on a virtual object, like the icon of a text document, and dragging it to a different location on the graphical user interface or onto another virtual object, e.g. the printer icon or the trashcan icon, of the graphical user interface. Starting from the known drag and drop feature linked to the presence of one or more graphical user interfaces, it is the object of the present invention to improve the drag and drop method.

This object is achieved with the method according to claim 15. In this method a step of dragging an object is carried out on a first location and the dropping of the object is carried out at a second location characterized in that one of the first and second location is over a graphical user interface and the other one outside any graphical user interface. With this method the drag and drop feature is not limited to the size of the screen or screens anymore which renders its use more flexible in any device using the drag and drop feature.

The invention furthermore relates to the use of the above described devices to carry out the drag and drop method according to the invention. However, according to another variant, the inventive drag and drop method can also be realised using an interaction means build up out of more than one part. According to a further advantageous the plurality of parts of the interaction means are spaced apart.

BRIEF DESCRIPTION OF DRAWINGS

Advantageous embodiments of the invention will be described in detail in relation to the accompanying Figures.

DETAILED DESCRIPTION OF SPECIFIC EMBODIMENTS OF THE INVENTION

Figure 1:
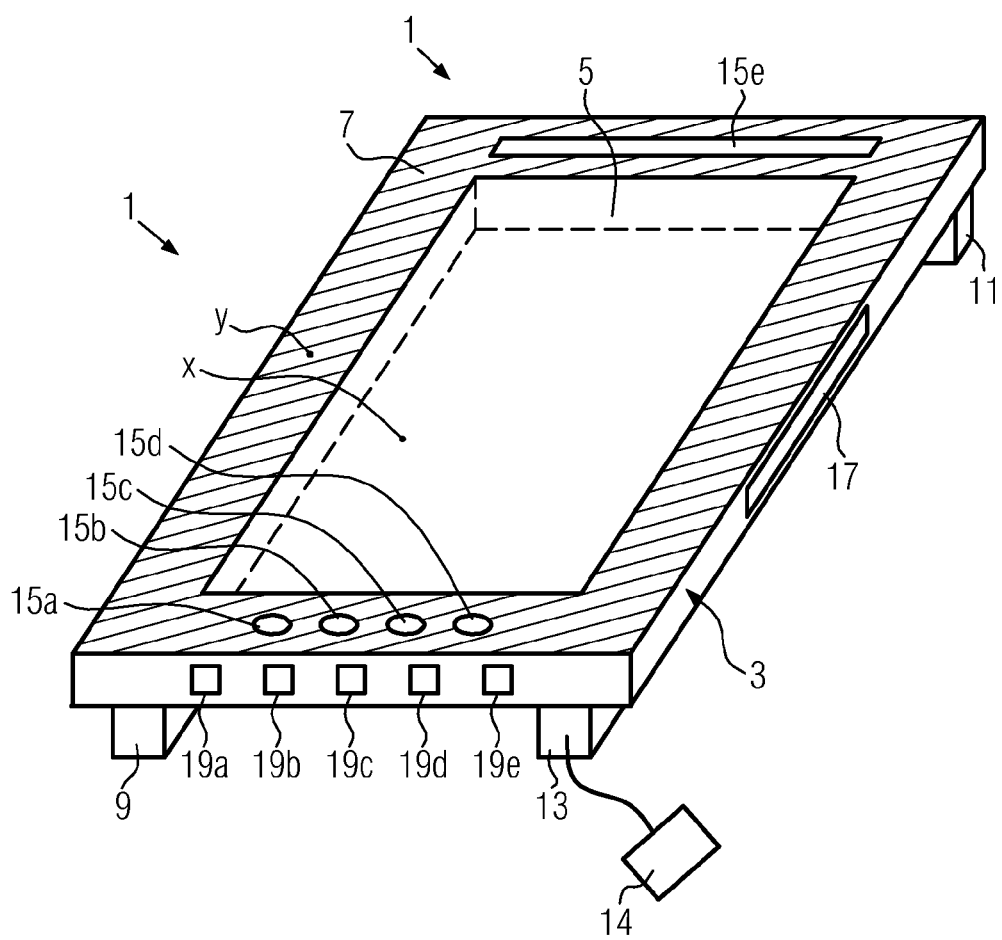
FIG. 1 illustrates a 3-dimensional schematic view of a first embodiment of a touch-sensitive panel according to the invention.

FIG. 1 illustrates a touch-sensitive panel 1 according to a first embodiment of the invention. It comprises an interaction means 3 with a first 5 and a second interaction area 7. In the first interaction area 5, the interaction means 3 is transparent. The second interaction area 7 is opaque for visible light, however, according to other variants it could also be transparent or partially transparent without departing from the scope of the invention. In this embodiment, the interaction means 3 is a glass plate, but it could also be made out of plastic or other suitable material. In this embodiment it is a plane plate, but the interaction means 3 could also have a curved shape.

The touch-sensitive panel 1 furthermore comprises two transforming means 9 and 11 for transforming a mechanical, in particular pressure, excitation on the front side of the interaction means 3, indicated by a "x" on the first interaction area 5 and a "y" on the second interaction area 7, into respective signals. In this embodiment, the transforming means 9 and 11 are transducers, like for example strain gauges or piezoelectric transducers, which are capable of sensing the acoustic signals being the result of the excitation at location "x" or "y". In this embodiment, two transforming means 9 and 11 are illustrated, however, it is also possible to provide touch-sensitive panels with more than two transforming means or with even only one.

The two transforming means 9 and 11 are linked with a processing means 13 which, based on the electric signals, identifies the positional coordinates of excitation "x" or "y" respectively. The processing means 13 can transmit the coordinates of the excitation to another device (not shown) via an interface connection 14. In this embodiment, the processing means is attached to the interaction means 3, which is however not mandatory.

The transforming means 9 and 11 are linked with the processing means via wires (not shown) which are, for example, printed on the back side of the interaction means 3.

Like already mentioned, the second interaction area 7 is opaque with respect to visible light. This is realized by providing an opaque film on the back side of the interaction means 3. Such an opaque film could be attached using an adhesive or directly printed onto the interaction means 3.

Furthermore, in this embodiment, the transforming means 9 and 11, as well as the processing means 13, are attached on the backside of the interaction means 3 in the second interaction area 7. Thus, they are not visible for a user looking to the front side of the touch-sensitive panel 1.

In the second interaction area 7, secondary button areas 15a-15d are provided on the front main surface on the interaction means 3 and additional secondary button areas 17 and 19a-19e are provided on two of the side walls of the interaction means 3. Of course, these secondary button areas could also be provided on the other sides of the interaction means which are not visible in the 3-D view of FIG. 1. According to further variants, secondary button areas might only be provided on the sides or only be provided on the front surface. According to even another variant, secondary button areas could also be provided on the back side, thus the side where the transforming means 9 and 11 are arranged, if necessary.

The secondary button areas can be rendered visible to a user by attaching a film to the front surface or by printing them to the front surface or by integrating them into the opaque film on the back side. They can be of any shape— circular, squared, rectangular, star shaped, etc.

Furthermore, the processing means 13 is configured such that, upon excitations of secondary button areas 15a-15e, 17, 19a-19e, and following the identification of the location of the excitations, the processing means can trigger a signal at the interface 14 so that, with this trigger signal, actions could be carried when the touch-sensitive panel 1 is in contact with a further device.

According to the invention, the interaction means 3 with its transparent first interaction area and the second interaction area 5, 7, is made out of a single piece. This has the advantage that, using the transforming means 9 and 11, excitations occurring on the entire surface of the single interaction means 3, thus in the first and/or second interaction areas, can be captured based on the acoustic waves originating from the excitation and the location of the excitation then be identified by the processing means 13. As there is no interface between the transparent part of the first interaction area 5 and the second interaction area 7, there is no degradation in the signal quality and, furthermore, the signals stay stable in time. In addition, the visual perception of this interaction means is attractive and, due to the smooth surface, such an interaction means 3 can be easily cleaned.

The touch-sensitive panel 1, according to the first embodiment, is realized as an independent module which can be simply attached to any device using, for example, an adhesive layer and, via the interface 14, can be connected to a corresponding interface of that device to render a screen of such device tactile.

Figure 2:
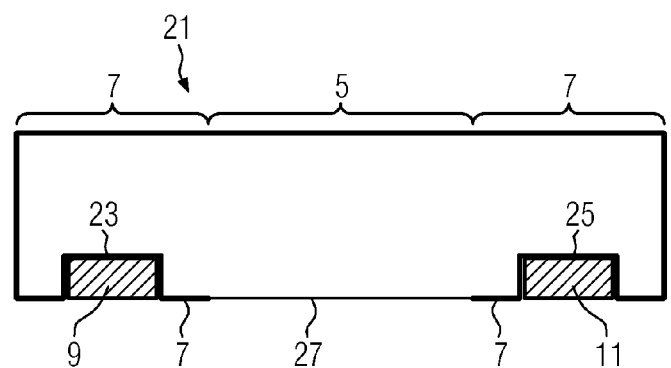
FIG. 2 illustrates a side-cut view of a second embodiment of the touch-sensitive panel according to the invention.

FIG. 2 illustrates a side-cut view of a second embodiment of a touch-sensitive panel 21 according to the invention. Features carrying the same reference numerals like in FIG. 1 are not described in detail again, but their description is incorporated herewith by reference. The only difference between the touch-sensitive panel 21 according to the second embodiment and the touch-sensitive panel 1 according to the first embodiment is that, in the second embodiment, the transforming means 9 and 11 are arranged in recesses 23 and 25 in the second interaction area 7 on the backside of the single interaction means 27 which, apart from the recesses 23 and 25, has the same features as the single interaction means 3 of the first embodiment. The volume of the recess is chosen such that the interaction means 9 and 11 and/or the processing means 13 do not protrude anymore from the back side surface of the interaction means 27. As indicated by the bold lines in the figure the opaque foil is also attached to the backside.

This embodiment has the advantage that, no additional elements protrude from the interaction means 3 thereby rendering the module easy to integrate into devices. In the side-cut view illustrated in FIG. 2, the processing means 13 is not illustrated. Of course, when attached to the interaction means 27, the processing means 13 can be arranged in a corresponding recess.

Figure 3A:
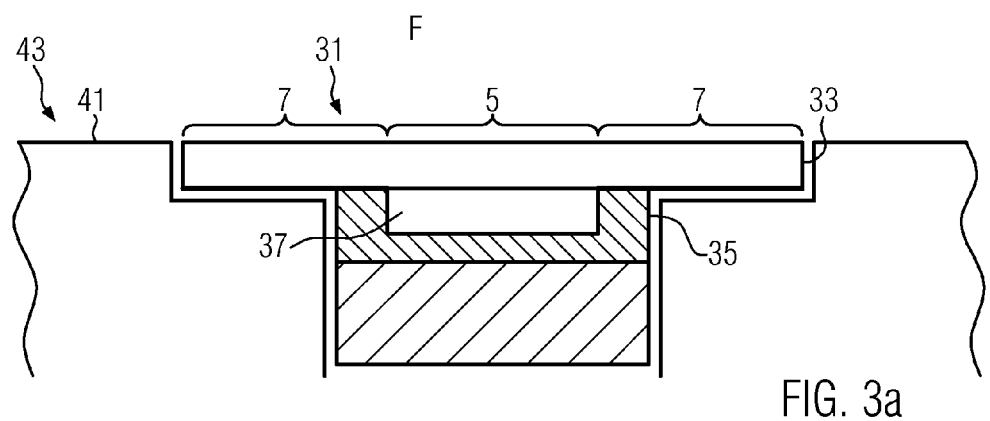
FIGS. 3a and 3b illustrate a device comprising a third and fourth embodiment of the touch-sensitive panel according to the invention.

FIG. 3a illustrates a third embodiment on the invention. It illustrates a device 31 comprising a touch-sensitive panel 33 according to the first or second embodiment, which is attached to a electronic device 39 with a screen 35 having a display panel 37.

This device 31 could, for example, be a laptop, an on-board computer, a mobile phone, a personal digital assistant, a television, a HiFi device, an automatic vending or teller machine, a playing console or a machine input device which becomes touch sensitive due to the use of the touch sensitive panel 33.

The particularity of this embodiment is that the touch-sensitive panel 33 extends laterally over the sides of the screen 35 and the electronic device 39. According to the invention, the touch-sensitive panel 33 has its transparent first interaction area 5 aligned with the display panel 37 of the screen 35 and its opaque second interaction area 7 arranged away from the display panel 37.

This device 31 could be incorporated into a piece of furniture or a dashboard panel such that the front surface of the device 31 represented by the touch-sensitive panel 33, can be flush mount with the surface 41 of the piece of furniture or dashboard panel 43. This device 31 provides additional input surfaces on the second interaction area 7 and can be nicely integrated into the surface of the piece of furniture or dashboard 43, eventually also by providing a curved surface.

Figure 3B:
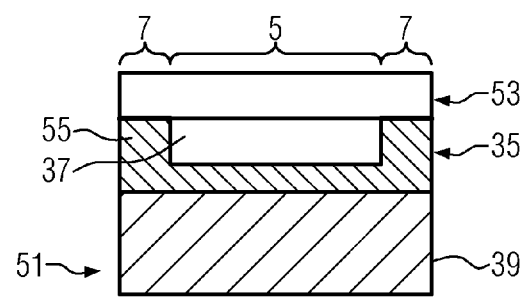

FIG. 3b illustrates a fourth embodiment of a device 51 according to the invention. Device 51 comprises a touch-sensitive panel 53, according to the first or second embodiment of the invention, and an electronic device 39 with a screen 35 with a display panel 37 having the same properties as in the third embodiment.

In contrast to the third embodiment, here the size of the touch-sensitive panel 53 is chosen such that it extends only over the area of the screen 35, at least in one dimension. The first interaction area 5 is again aligned with the display panel 37—in particular in both dimensions. The second interaction area 7 is aligned with the frame 55 of screen 35. In this configuration, the unused frame area of screen 35 is turned into an area useful for inputting activities, e.g. by using the secondary button areas (see FIG. 1).

Figure 4A:
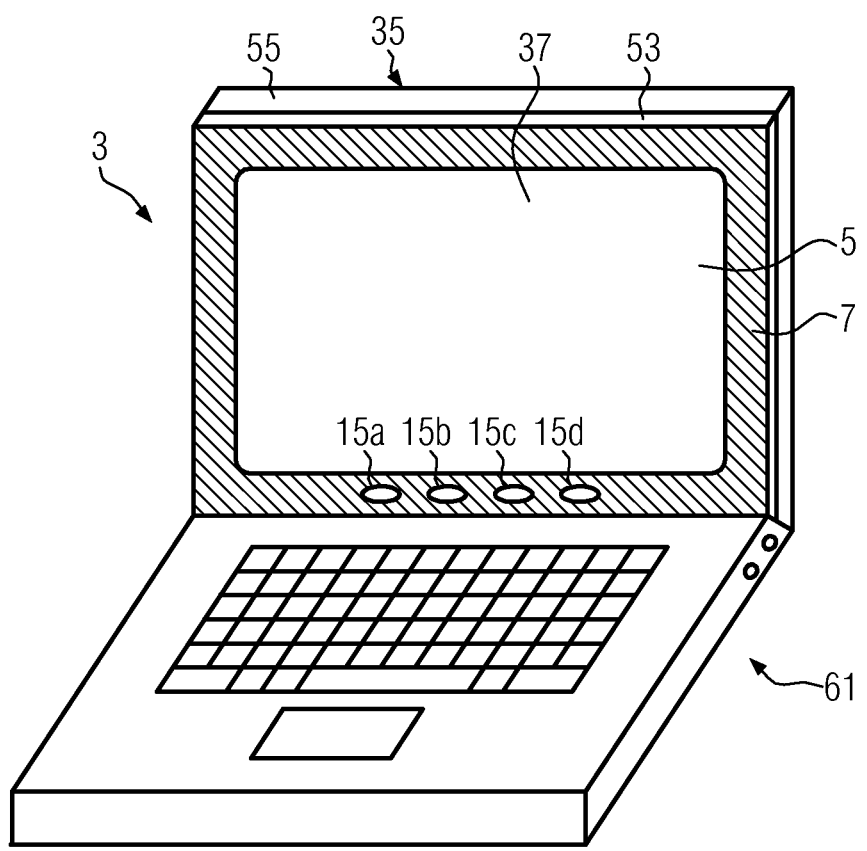
FIG. 4a illustrates a laptop computer comprising a touch-sensitive panel module according to the invention.

FIG. 4a illustrates a practical example of the invention. It shows a laptop computer 61 comprising a touch-sensitive panel 53 according to the fourth embodiment on the invention. As can be seen, the touch-sensitive panel 53 is flush mount with the screen 35 such that the first interaction area 5 of the touch sensitive panel 53 is arranged over the display panel 37 of screen 35 and the second interaction area 7 with secondary button area 15a-15d is arranged over the frame 55 of screen 35. Secondary buttons 15a and 15d are configured as additional input means, for example button 15a can be configured such that, upon its excitation by a user, the computer is turned on (hard key functionality) and buttons 15b-15d can be linked to soft key actions like connecting to the internet, printing a document etc.

According to further variants the secondary buttons 15a to 15d can be dedicated to hardware functionalities like setting up the screen, e.g. its brightness, its contrast or to open its set up menu, or setting the audio volume. The secondary buttons 15a to 15d are typically represented by different pictograms and enable, by a simple touch or by dragging like described further down, to access to the functionalities described.

According to a further variant, the second interaction area comprises a secondary button in the form of a trackpad area and wherein the processing means 13 is configured to output signals representing the coordinates on the trackpad area following an excitation. This information can then be used to move the cursor on the display panel 37 of the screen 35.

In yet another variant, the keyboard illustrated in FIG. 4a can also be incorporated in the second interaction area 7. The virtual keyboard can be provided by a material treatment or a direct printing on the material of the interaction means 3. The processing unit 13 is then configured such that impacts detected on a given key results in the output of a corresponding signal just like with a classic mechanic keyboard.

The benefits of also using the area outside the first interaction area 5 positioned above the screen 35 are the following: The interaction means 3 is easy to clean and, in particular, easier to clean than the physical buttons. In addition, an attractive, continuous, pure and simple design can be realized. Finally, the secondary buttons can be realized without additional hardware costs in the presence of a touch sensitive functionality.

Figure 4B:
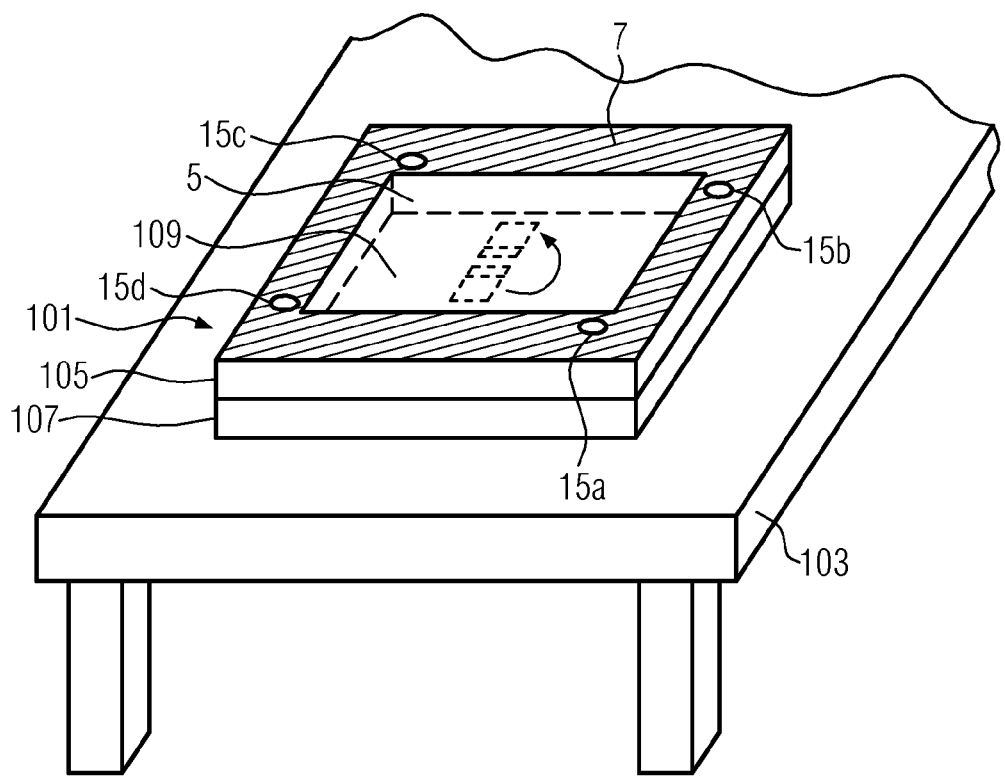
FIG. 4b illustrates a screen with a touch-sensitive panel according to the invention.

The inventive touch sensitive panel 3, 21, 33, 53 furthermore allows numerous software related applications. According to one inventive embodiment, illustrated in FIG. 4b, a flat device 101, e.g. positioned on a table 103, comprises a touch-sensitive panel 105 which has the properties of the panels as described above, e.g. like the panel 53 of the fourth embodiment of the invention, and a screen 107.

Again, the touch-sensitive panel 105 is flush mount with the screen 101 such that the first interaction area 5 of the touch sensitive panel 105 is arranged over the display 109 of screen 107 and the second interaction area 7 with secondary button areas 15a-15d is arranged over the frame of screen 107. In this embodiment, the secondary button areas 15a to 15d are configured to affect the way information is displayed on the display 109 or displayed in a window of a particular software application. Here, the secondary button areas 15a to 15d are distributed around the first interaction area 5 such that one button area is positioned on each side.

The device, in particular its processing means 13, is configured such that upon the detection of an impact on one of the secondary button areas 15a to 15d, the operating system or an application of the device 101 is set in a "Pending for display rotation" state. Once the display is pending for rotation, an elliptic movement on the first and/or second interaction area 5, 7 leads to the rotation of the information displayed. The device could be configured such that the rotation corresponds to a 90°, 180° or 270° rotation, according to another variant the rotation is automatically carried out upon detection of an impact on one of the secondary button areas 15a to 15d. The automatic rotation is preferably such that a person hitting the closest secondary button area will be able to read the information displayed. This embodiment allows one user to enable the reading of an image to another user located on another side of the table 103.

Another softkey application of the inventive touch sensitive panel 3, 21, 33, 53 relates to a zoom in/zoom out functionality. The processing unit 13 instructs to increase/decrease instantaneously the resolution of the screen upon the detection of an impact on a secondary button area provided in the second interaction area 7.

Once the screen is "zoomed", a dragging action, identified by the processing unit 13, over the first interaction area 5 enables the user to move within the zoomed display so as to find the particular area he wishes to observe. Actions within the displayed zoomed content can in addition be disabled. A return to the initial resolution is achieved upon a further impact on the corresponding secondary button. Interactions with the content can then again be enabled.

This functionality enables to increase the viewed document resolution independently from the software which is used. By dragging the zoomed document, there is no need to use side elevators to navigate in the document.

Figure 5:
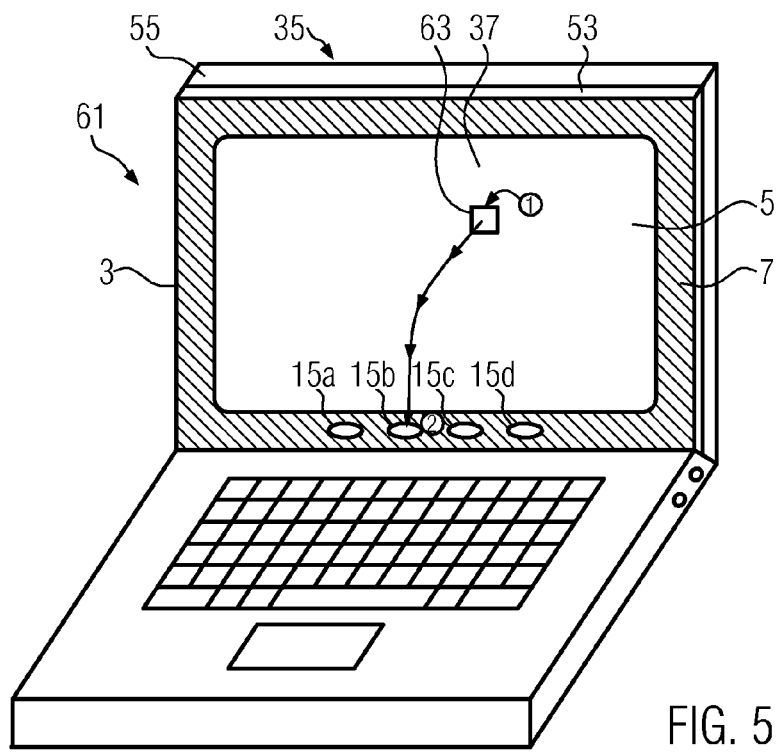
FIG. 5 illustrates one inventive application of a touch-sensitive panel.

FIG. 5 illustrates a "drag and drop" embodiment according to the invention. FIG. 5 again shows the inventive device 61, already illustrated in FIG. 4. In this embodiment, device 61, for example the processing means 13 of the touch-sensitive panel 53, is configured such that, upon an excitation at position 1 on the first interaction area 5 of the touch-sensitive panel 53, a document 63 present on the display panel 37 of the screen 35 of the laptop 61 is chosen and, via a sliding action on the surface of the interaction means 3 of the touch-sensitive panel 53, the document 63 is dragged in the direction of the secondary button area 15b on the second interaction area 7 of the touch-sensitive panel 53. The lift-off action of the finger of a user at that position can be identified by the processing means 13 (not shown) due to particularities in the signal and interpreted as a drop off action, leading, for example, to a print out of the document. Thus, by doing so, it becomes possible to combine the screen with an additional virtual input surface thereby enlarging the in- and output areas of the screen itself.

The inventive drag and drop method is not limited to the presence of a one part interaction means, but can also be applied to interaction means build up out of a plurality of parts. Eventually, in this case, the various parts could also be spaced apart.

Figure 6:
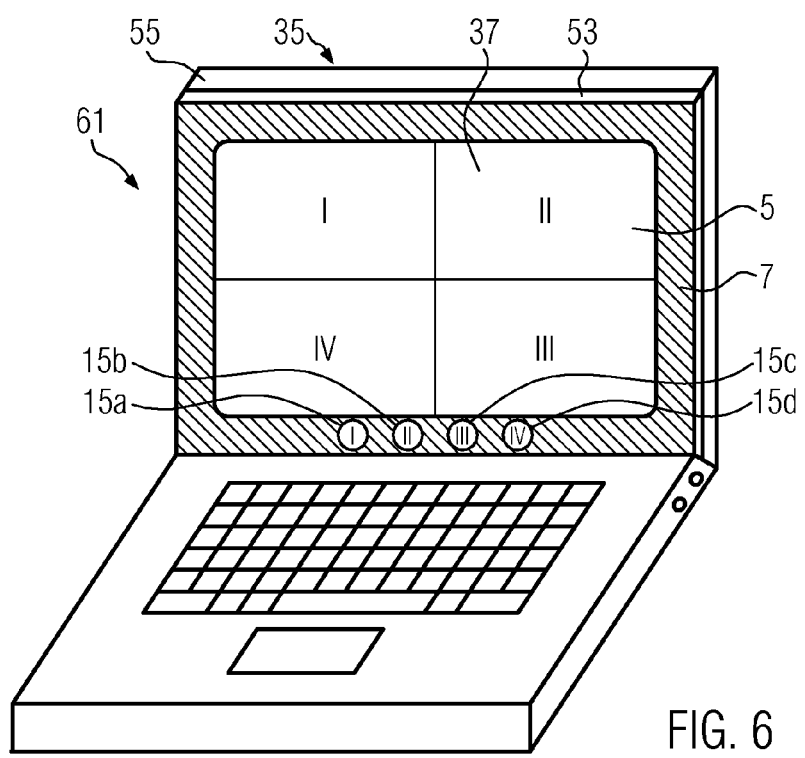
FIG. 6 illustrates a second inventive application.

FIG. 6 illustrates an additional application in which the laptop computer 61 with the sensitive panel 53 is configured such that the display is split into four regions I-IV and secondary buttons 15a-15d are configured such that, upon an input at one of these locations, positioned outside the display, the corresponding area of the touch screen becomes enlarged to cover the entire display panel surface 37.

The applications illustrated in FIGS. 4 to 6 are not limited to use in a laptop computer but can be realized with any device like described above.

Above the invention has been described for an application in which acoustic waves are analysed to identify the location of an excitation in the first and/or second interaction area. Nevertheless, the invention is not limited to this particular touch screen technology, but could also applied to other technologies, like resistive or capacitive touch screen technologies, using other kinds of transforming means, e.g. ITO layers, acoustic reflectors, photoreceptors, etc.

Figure 7:
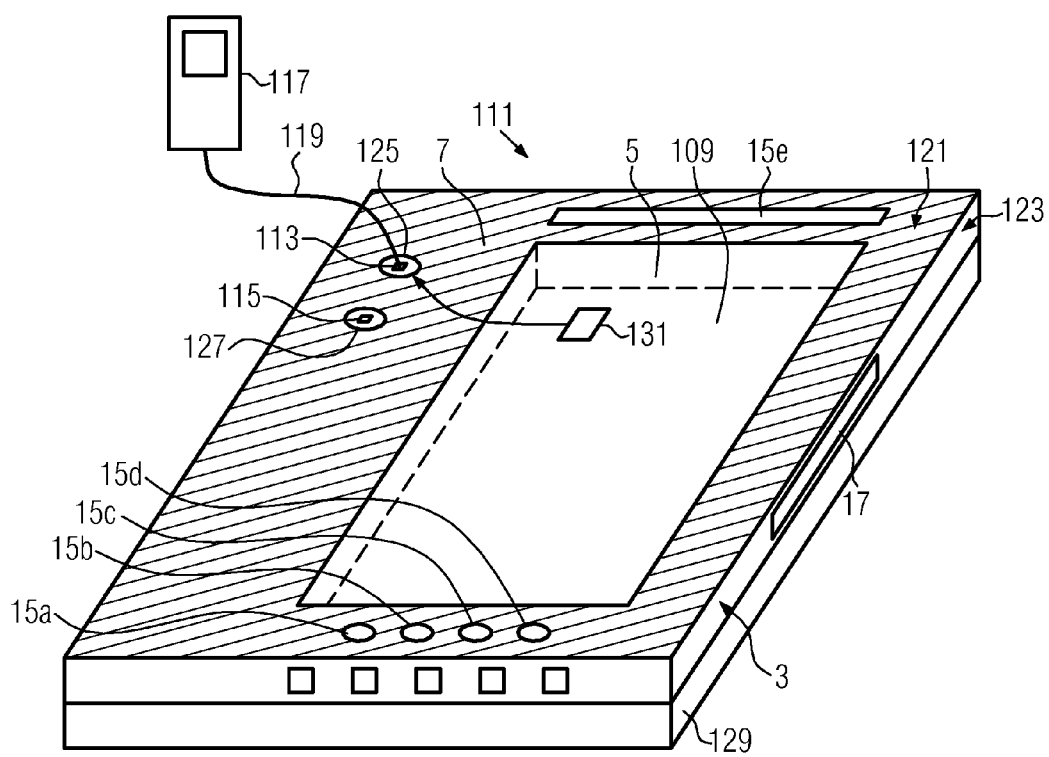
FIG. 7 illustrates a fifth embodiment of the invention.

FIG. 7 illustrates a fifth embodiment of the invention, namely a touch-sensitive panel 111 comprising all the features of the touch-sensitive panel 1 of the first embodiment. Thus elements with the same reference numeral as in FIG. 1 will not be described again in detail, but their description is incorporated by reference.

The touch-sensitive panel 111 according to the fifth embodiment furthermore comprises at least one, in this realization two, interfaces 113, 115 allowing a connection with an external device. In FIG. 7, an external device 117 is connected via a cable 119 with the interface 113. The interfaces 113, 115 are positioned within the second interaction area 7. In this embodiment the interfaces 113, 115, e.g. a USB interface, or a phono connector, etc., are arranged on the main surface 121 of the single interaction means 3. This configuration facilitates the connection of devices which are, in particular, connected and removed on a regular basis, e.g. like external storage devices, mobile phones, multimedia players, cameras or dictaphones, etc., as the interface 113, 115 is easily accessible. Other applications could be connections with smart furniture comprising electromagnetic features, or backlighting or a lock or relate to home automation, like launch music, room lighting, surveillance, shutter control or heating managed form a central device. According to variants the interfaces could also be present on one of the sides 123 of the interaction means 3.

The second interaction area 7 comprises button areas 125 and 127 which are assigned to the interfaces 113 and 115 respectively. In this embodiment the button areas 125 and 127 are encircling the interfaces 113 and 115. By being arranged in the vicinity or even touching the interfaces 113, 115 a clear indication of their attribution to the corresponding interface is achieved.

In this embodiment the processing unit (not shown, reference number 13 in FIG. 1) is further configured such that upon excitation of the button areas 125 or 127, e.g. by a user tapping on that area of the second interaction area 7, an interaction task between the external device 117 and device 129 which has the display 109 of its screen positioned underneath the first interaction area 5 and which is connected to interface (now shown, reference number 14 in FIG. 1), is carried out.

This embodiment can be used as follows: When the external device 117 is connected to interface 113, a direct shortcut giving access to this particular external device is assigned to the button area 125. In the connected state, a light source (not shown), e.g. a colour LED, positioned underneath the single interaction means 3 is switched on by the processing unit. Eventually a message can be displayed on the first interaction area 5 informing the user about the established connection and that the button area 113 is now available for data transfer. Then the user can move a file or folder 131 displayed on display 109 seen through the first interaction area 5 to this button area 113, e.g. using the drag and drop method described above and the content can be transferred to the external device.

This embodiment provides increased ergonomics with respect to the use of the connected external device 117, in particular by materializing its access for data transfer around the physical connection of the external device 117 to the touch-sensitive panel 111.

According to a variant of the fifth embodiment, an interface providing wireless connectivity could be provided instead of a cable based interface. In this case a virtual interface representative of the wireless connectivity is provided on the second interaction area 7.

Figure 8:
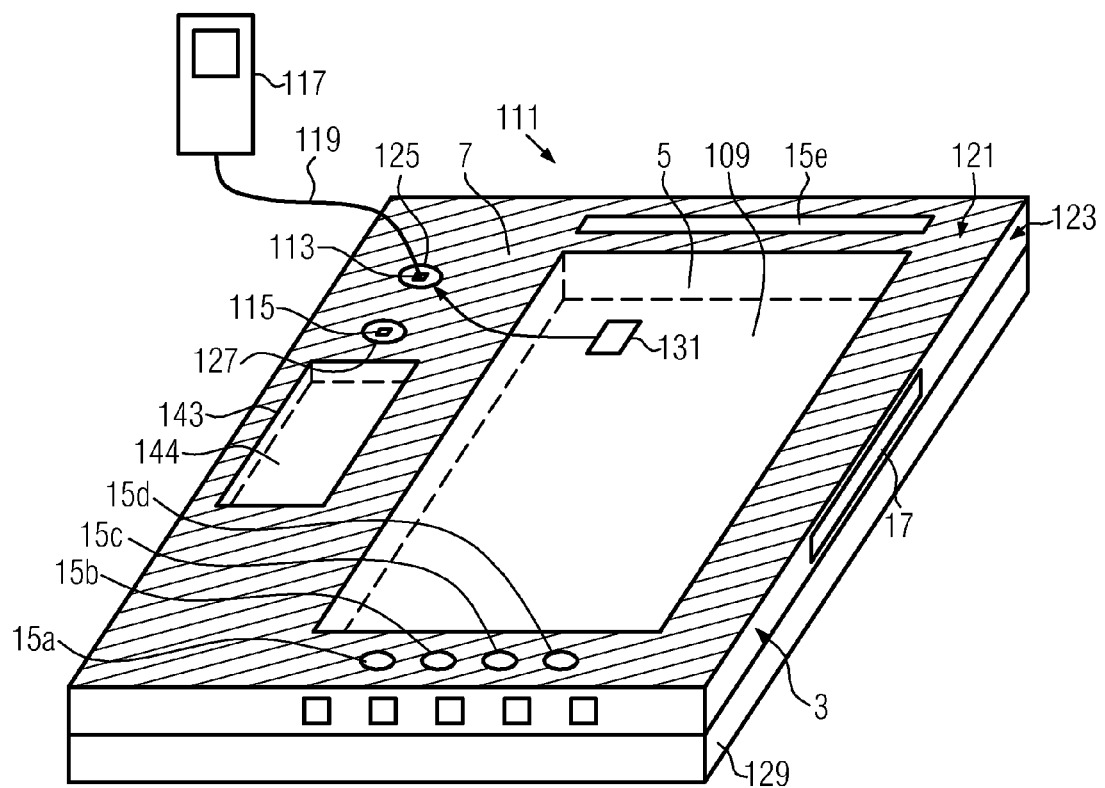
FIG. 8 illustrates a sixth embodiment of the invention.

The touch-sensitive panel 141 according to the sixth embodiment of the invention illustrated in FIG. 8 is based on the touch-sensitive panel 111 of the fifth embodiment. Features with reference numerals already used in the description of the fifth embodiment will therefore not be explained again, but their description is incorporated herewith by reference.

In this embodiment, the single interaction means 3 comprises a third interaction area 143, which is transparent like the first interaction area 5. The third interaction area 143 is positioned within the second interaction area 7. A secondary display device 144 which can be part of device 129 is positioned underneath the third interaction area 143, thus besides the first display 109 of device 129. Nevertheless, the two displays 109, 144 are placed under the same tactile surface, namely the single interaction means 3.

When an external device 117 is plugged into interface 113 or 115 close to the secondary display device 144, the device 129 is configured such that the content of the peripheral external device 117 is automatically displayed on the secondary display device 144, which can be looked at through the transparent third interaction area 143.

In this case, the secondary display device 144 is thus totally dedicated to the external device 117. The common tactile surface provided by the single interaction means 3, can offer a "tactile continuity" between the two displays and thus between the two devices 129 and 117. By sliding a finger between the first and third interaction area, the movement of the sliding is detected by the processing unit (see FIG. 1) via the transforming means 9 and 11, a user has the possibility to virtually move or copy an object like a file, a folder, or a shortcut, etc., from one screen to another.

This feature of the sixth embodiment extends the interactivity with the connected peripheral by, in addition to the previous embodiment, providing access to the content of the external device shown on the secondary display. Further, additional display devices and transparent interaction areas can be provided, if necessary.

According to a variant, the secondary display device 144 is dedicated to a specific application of device 129. For instance, it can be reserved to audio and/or video tasks. The content and/or functionality of external devices, e.g. 117, also dealing with audio and/or video data are then displayed on the secondary display 144 together with the internal audio/video resources of device 129. Using the touch-sensitive capabilities of the panel 141, the user has the possibility to navigate through the content of all audio/video related data and like in the previous embodiments will also be able to drag and drop an object like a file or folder, over the single interaction means 3 from the main screen to the secondary display device and vice versa. This action, detected by the processing unit 3, then triggers the copy of the actual object from device 129 to the audio device 117 or vice versa or starts the reading of the selected object.

This variant facilitates the handling of a dedicated task of a device, like a personal computer.

All embodiments described above have in common that a single interaction means 3 is placed above one or more display devices. The tactile surface is not only limited to the surfaces on top of the displays (first and third interaction area) but impacts on the second interaction area 7 or the secondary button areas 15a to 15e, 17, 19a to 19e or 113, 115 away from the display/s are also detected by the processing unit 13 and can trigger actions. This global, unique and single user interface allows the creation or management of tactile areas assigned to folders, files, applications, URIs (Uniform Resource Identifier) or any specific actions, like send to the bin, copy, paste, desktop, switch between applications.

The functionalities outside the main display therefore provide a quick access to often used functionalities by using a button located outside the touch screen area.

In order to inform the user about the functionalities, it is possible to use the main display device or the secondary display to display the name or a pictogram of the functionality preferably in the vicinity of the location of the corresponding secondary button area.

To create a new shortcut, an object is dragged to one of the dedicated areas in the second interaction area 7. The main or secondary screen then reacts by creating an icon close to the chosen area of the second interaction area and a direct link to this original object (URI). Alternatively, the user can also touch a dedicated area of the secondary screen attributed to a certain secondary button area to create a new shortcut and to type its target. As a consequence, a shortcut is created to the specific target and attributed to the chosen location on the second interaction area 7.

This feature of the invention enables the user to create his own shortcuts on the part of the interaction means that is arranged away from the displays.

Figure 9:
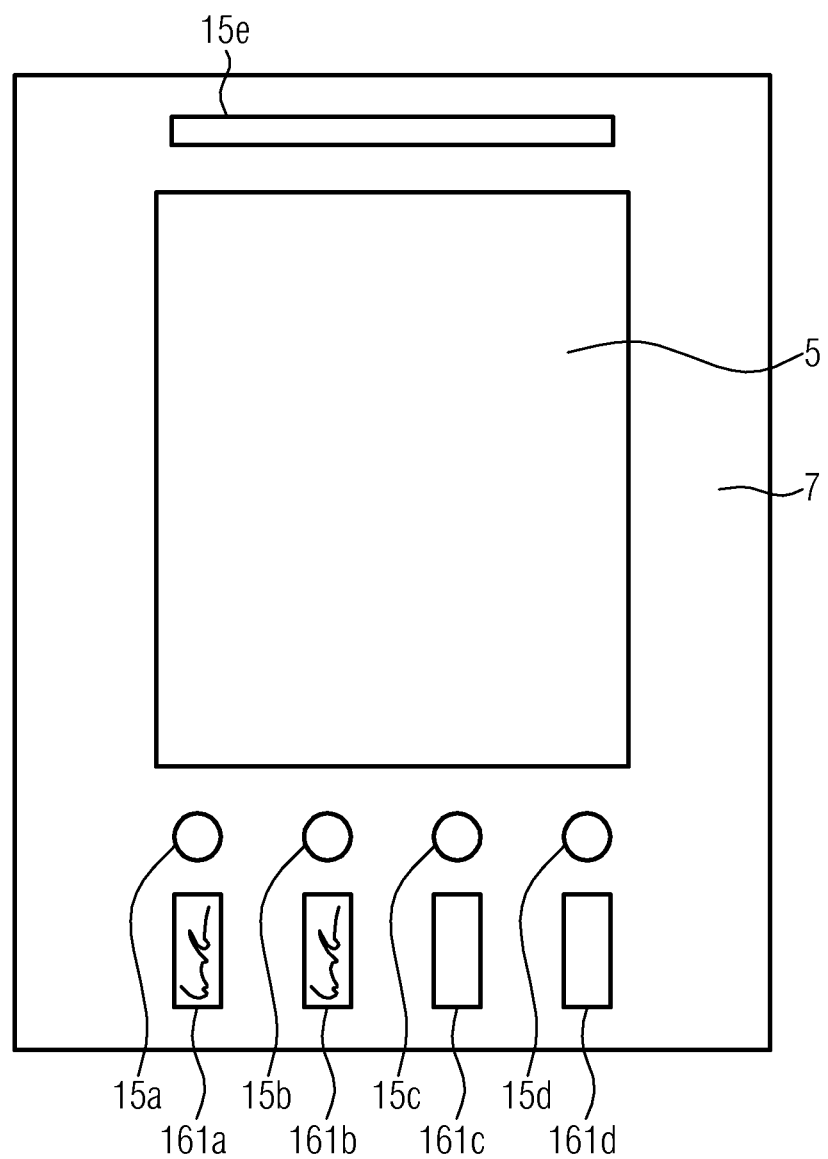
FIG. 9 illustrates a variant applicable to any one of the embodiments.

According to a variant, writable areas 161a to 161d are provided on the second interaction area 7 in the vicinity of the secondary button areas 15a to 15d, like illustrated in FIG. 9. The writable areas can be used to explain the purpose of the button areas 15a to 15d. Various solutions can be considered such as: a removable tag stuck on the tactile objet (paper, carton, plastic film), a vinyl like plastic sheet added on to the tactile surface or a surface treatment of the glass allowing it to see writing on it (sandblasting, silk-screening). This feature can be combined with any one of the touch sensitive panels according to embodiments 1 to 6.

This additional feature of the invention allows an easy and low cost customization of the user interface.

The invention claimed is:

1. A touch sensitive panel comprising:
   a one piece, single interaction component with at least a first and a second interaction area, wherein:
      the single interaction component is transparent in the first interaction area and opaque in the second interaction area, wherein the second interaction area includes an opaque film applied at a back side of the single interaction component; and
      the single interaction component comprises one of a one piece glass material or a one piece plastic material;
   at least one transducer configured to transform acoustic waves created by impacts caused by an object in contact with either the first or the second interaction areas of the single interaction component into respective signals; and
   processing circuitry configured to identify positions of the impacts based on the respective signals, wherein:
      the single interaction component includes a third interaction area positioned on the main surface of the single interaction component;
      the touch sensitive panel further includes an external interface configured to allow a connection with an external device;
      the third interaction area includes a button area associated with the at least one external interface; and
      the processing-circuitry is configured to trigger a data transfer with the external device upon determining an excitation of the button area when the external device is connected with the external interface.

2. The touch sensitive panel according to claim 1, wherein the second interaction area comprises secondary button areas and wherein the processing circuitry is configured to trigger predetermined actions upon an excitation of at least one of the secondary button areas.

3. The touch sensitive panel according to claim 1, wherein one or more of the at least one transducer and the processing circuitry are arranged in the second interaction area.

4. The touch sensitive panel according to claim 1, wherein one or more of the transducer and the processing circuitry are embedded in the single interaction component.

5. The touch sensitive panel according to claim 1, wherein the single interaction component, the at least one transducer, and the processing circuitry form a module.

6. The touch sensitive panel according to claim 5, wherein the module attached to a device turns the device into a touch-sensitive device.

7. The touch sensitive panel according to claim 6, wherein the device provides additional input surfaces on the second interaction area.

8. The touch sensitive panel according to claim 1, wherein the single interaction component furthermore comprises at least a third interaction area, and the third interaction area is transparent.

9. The touch sensitive panel according to claim 1, further comprising a writable area over the second interaction area.

10. The touch sensitive panel according to claim 1, wherein the touch sensitive panel is included with a device including one of a laptop, an on-board computer, a mobile phone, a personal digital assistant (PDA), a television, a HiFi device, an automatic vending or teller machine, a playing console or a machine input device, the device further comprising a screen with a display panel.

11. The touch sensitive panel according to claim 10, wherein the touch sensitive panel is arranged such that the first interaction area is over the display panel of the screen thereby forming a touch sensitive display and such that the second interaction area is positioned away from the display panel.

12. The touch sensitive panel according to claim 11, wherein the processing circuitry is configured to carry out predetermined actions upon determining an excitation at a predetermined area of the second interaction area, wherein the predetermined actions are associated with one or more of information displayed on the screen and a hardware functionality.

13. The touch sensitive panel according to claim 10, wherein the processing circuitry is further configured to determine a dragging of an object from the screen based on an excitation on the first interaction area and a dropping of the object onto a secondary button area of the second interaction area based on a subsequent excitation on the second interaction area.

14. The touch sensitive panel according to claim 10, wherein the second interaction area extends over an area of a frame of the display panel.

15. The touch sensitive panel according to claim 10, wherein the single interaction component extends laterally on at least one side over the device.

16. The touch sensitive panel according to claim 10, wherein the processing circuitry is configured to carry out a scroll bar functionality based on excitations identified on a side surface of the single interaction component.

17. The touch sensitive panel according to claim 10, further comprising at least one interface configured to allow a connection with an external device and arranged within or adjacent to the second interaction area:
   wherein the second interaction area comprises a predetermined area associated with the interface; and
   wherein the processing circuitry is configured to trigger a predetermined interaction task between the device and the external device upon determining an excitation at the predetermined area associated with the interface.

18. The touch sensitive panel according to claim 17, wherein the predetermined area associated with the interface of the second interaction area is adjacent to an edge region of the interface.

19. The touch sensitive panel according to claim 18, wherein the predetermined area associated with the interface encircles the interface.

20. The touch sensitive panel according to claim 17, wherein the interface is on a main surface of the single interaction component.

21. The touch sensitive panel according to claim 1, further comprising a secondary screen with a secondary display panel positioned underneath a third transparent interaction area.

22. The touch sensitive panel according to claim 21, further comprising at least one interface configured to allow a connection with an external device and arranged within or adjacent to the second interaction area: wherein the processing circuitry is configured to trigger a predetermined interaction task between the device and the external device upon determining an excitation of the third interaction area.

23. A method of performing a drag and drop on a touch sensitive panel, comprising:
  selecting a displayed object at a first interaction area of a one piece, single interaction component with at least the first interaction area and a second interaction area, wherein:
    the single interaction component is transparent in the first interaction area and opaque in the second interaction area;
    the single interaction component comprises one of a one piece glass material or a one piece plastic material; and
    the second interaction area includes an opaque film applied at a back side of the single interaction component;
  dragging the displayed object from the first interaction area to the second interaction area; and
  dropping the displayed object at the second interaction area, wherein the selecting, dragging, and dropping of the displayed object results in acoustic waves created by impact caused by object contact with the first interaction area and the second interaction area of the single interaction component that are transformed by at least one transducer into signals, and wherein:
    single interaction component includes a third interaction area positioned on the main surface of the single interaction component;
    the third interaction area includes a button area associated with an external interface; and
    the method further includes, in response to an external device being connected with the external interface and a second displayed object being dropped at the button area of the third interaction area, triggering a data transfer with the external device.

* * * * *

UNITED STATES PATENT AND TRADEMARK OFFICE
CERTIFICATE OF CORRECTION

| | | |
|---|---|---|
| PATENT NO. | : 9,489,089 B2 | Page 1 of 1 |
| APPLICATION NO. | : 12/863258 | |
| DATED | : November 8, 2016 | |
| INVENTOR(S) | : Sebastien Chaine, Thomas Fillon and Sebastien Pelletier | |

It is certified that error appears in the above-identified patent and that said Letters Patent is hereby corrected as shown below:

On the Title Page

(75) Inventors: Thomas Filton, Savigny-sur-Orge (FR)
Delete "Filton" and insert --Fillon--

Signed and Sealed this
Twenty-eighth Day of February, 2017

Michelle K. Lee
*Director of the United States Patent and Trademark Office*